(12) United States Patent
Ganesan

(10) Patent No.: US 8,078,164 B2
(45) Date of Patent: Dec. 13, 2011

(54) MOBILE TELEPHONE VOIP/CELLULAR SEAMLESS ROAMING SWITCHING CONTROLLER

(75) Inventor: Vasudevan Ganesan, Cupertino, CA (US)

(73) Assignee: Vasu Networks Corporation, Cupertino, CA (US)

( * ) Notice: Subject to any disclaimer, the term of this patent is extended or adjusted under 35 U.S.C. 154(b) by 668 days.

(21) Appl. No.: 11/330,675

(22) Filed: Jan. 11, 2006

(65) Prior Publication Data
US 2006/0121894 A1 Jun. 8, 2006

Related U.S. Application Data

(63) Continuation-in-part of application No. 11/031,498, filed on Jan. 6, 2005.

(60) Provisional application No. 60/643,829, filed on Jan. 14, 2005, provisional application No. 60/534,466, filed on Jan. 6, 2004.

(51) Int. Cl.
*H04W 4/00* (2009.01)
(52) U.S. Cl. .................. 455/432.1; 455/436; 455/437; 455/440
(58) Field of Classification Search .......... 455/432.1, 455/432.2, 432.3, 436, 437, 438, 442
See application file for complete search history.

(56) References Cited

U.S. PATENT DOCUMENTS

| | | | |
|---|---|---|---|
| 6,515,983 B1 * | 2/2003 | Utas | 370/352 |
| 6,553,022 B2 | 4/2003 | Hartmaier | 370/352 |
| 6,584,087 B1 * | 6/2003 | Czaja et al. | 370/335 |
| 6,754,833 B1 | 6/2004 | Black et al. | |
| 6,862,444 B2 | 3/2005 | Karaoguz et al. | |
| 6,996,107 B2 | 2/2006 | Janoska | 370/395.4 |
| 7,127,232 B2 | 10/2006 | O'Neil et al. | |

(Continued)

FOREIGN PATENT DOCUMENTS

JP 200226994 A 1/2002

(Continued)

OTHER PUBLICATIONS

3GPP Organizational Project, "3$^{rd}$ Generation Partnership Project; Technical Specification Group Services and System Aspects Service aspects; Handover requirements between UTRAN and GERAN or other radio systems (Release 8)", Mar. 2006, pp. 1-20.

(Continued)

*Primary Examiner* — Joseph Feild
*Assistant Examiner* — Huy Nguyen
(74) *Attorney, Agent, or Firm* — Haverstock & Owens

(57) ABSTRACT

A nomadic server and a related system provides seamless roaming for a mobile communication device between different types of wireless networks, such as WiFi and cellular networks for voice, data and video communication. Use of the nomadic server enables a combination of WiFi and cellular networks for providing access to the cellular phones and make use of the VOIP networks for switching the calls wherever possible. The nomadic server is a telephone communication processing and switching server that will "hold" the present, in-progress telephone communications without dropping, while roaming without losing the present, in-progress communication. For example, a telephone communication can be seamlessly switching between VOIP and cellular telephone networks using the nomadic server. Nomadic server resources interface with the VOIP and cellular network switches to provide the hand-off between networks. This approach enables switching of telephone communications over a VOIP network wherever possible either through WiFi or through cellular networks.

23 Claims, 2 Drawing Sheets

U.S. PATENT DOCUMENTS

| | | | |
|---|---|---|---|
| 7,142,847 B2 * | 11/2006 | Umeda et al. | 455/418 |
| 7,382,763 B2 | 6/2008 | Ludwig et al. | 370/349 |
| 7,512,796 B2 | 3/2009 | Haverinen et al. | |
| 2001/0049790 A1 * | 12/2001 | Faccin et al. | 713/185 |
| 2002/0007817 A1 | 6/2002 | Sim et al. | 709/219 |
| 2002/0150228 A1 * | 10/2002 | Umeda et al. | 379/220.01 |
| 2003/0083079 A1 | 5/2003 | Clark et al. | |
| 2003/0086366 A1 | 5/2003 | Branlund et al. | 370/208 |
| 2003/0087629 A1 * | 5/2003 | Juitt et al. | 455/411 |
| 2003/0112766 A1 | 6/2003 | Riedel et al. | 370/252 |
| 2003/0217007 A1 | 11/2003 | Fukushima et al. | |
| 2003/0217091 A1 | 11/2003 | Echigo et al. | |
| 2003/0224792 A1 | 12/2003 | Verma et al. | |
| 2004/0005878 A1 | 1/2004 | Olin et al. | 455/414.1 |
| 2004/0030791 A1 | 2/2004 | Dorenbosch et al. | 709/230 |
| 2004/0085959 A1 | 5/2004 | Ohkawa | |
| 2004/0087307 A1 * | 5/2004 | Ibe et al. | 455/436 |
| 2004/0105424 A1 | 6/2004 | Skoczkowski et al. | 370/352 |
| 2004/0127208 A1 * | 7/2004 | Nair et al. | 455/420 |
| 2004/0132427 A1 | 7/2004 | Lee et al. | 455/406 |
| 2004/0137902 A1 | 7/2004 | Chaskar et al. | |
| 2004/0174880 A1 | 9/2004 | White et al. | 370/392.3 |
| 2004/0203666 A1 | 10/2004 | Foster et al. | 455/414.1 |
| 2004/0203788 A1 | 10/2004 | Fors et al. | |
| 2004/0218575 A1 | 11/2004 | Ibe et al. | 370/338 |
| 2004/0229618 A1 * | 11/2004 | Adatrao et al. | 455/442 |
| 2005/0059400 A1 | 3/2005 | Jagadeesan et al. | 455/436 |
| 2005/0147049 A1 | 7/2005 | Ganesan | 370/241 |
| 2005/0149740 A1 | 7/2005 | Kotzin et al. | |
| 2006/0040711 A1 | 2/2006 | Whistler | |
| 2006/0050663 A1 | 3/2006 | Ganesan | 370/328 |
| 2006/0050687 A1 | 3/2006 | Ganesan | 370/352 |
| 2006/0050721 A1 | 3/2006 | Ganesan | 370/401 |
| 2006/0080423 A1 | 4/2006 | Brewer et al. | 709/223 |
| 2006/0146767 A1 * | 7/2006 | Moganti | 370/338 |
| 2006/0234678 A1 * | 10/2006 | Juitt et al. | 455/411 |
| 2006/0291455 A1 | 12/2006 | Katz et al. | |
| 2007/0076665 A1 * | 4/2007 | Nair et al. | 370/335 |
| 2007/0112948 A1 | 5/2007 | Uhlik | |
| 2007/0249390 A1 * | 10/2007 | Purkayastha et al. | 455/552.1 |
| 2009/0070489 A1 | 3/2009 | Lu et al. | |
| 2011/0010282 A1 | 1/2011 | Olin et al. | |

FOREIGN PATENT DOCUMENTS

| | | |
|---|---|---|
| JP | 2004320473 A | 11/2004 |
| WO | 2004/013998 A2 | 2/2004 |
| WO | 2004/057903 A1 | 7/2004 |

OTHER PUBLICATIONS

3GPP Organizational Project, "3$^{rd}$ Generation Partnership Project; Technical Specification Group Services and System Aspects Service aspects; Service principles (Release 8)", Mar. 2006, pp. 1-45.

3GPP Organizational Project, 3$^{rd}$ Generation Partnership Project; Technical Specification Group Service and System Aspects; Service Requirements for the AII-IP Network (AIPN); Stage 1 (Release 8), Mar. 2006, pp. 1-24.

"Unlicensed Mobile Access (UMA); Protocols (Stage 3)", May 2, 2005, pp. 1-162.

* cited by examiner

MOBILE TELEPHONE VOIP/CELLULAR SEAMLESS ROAMING SWITCHING CONTROLLER

RELATED APPLICATIONS

This application claims priority of U.S. provisional application, Ser. No. 60/643,829, filed Jan. 14, 2005, and entitled "TELEPHONE COMMUNICATIONS PROCESSING CONTROLLER," by the same inventors. This application incorporates U.S. provisional application, Ser. No. 60/643,829, filed Jan. 14, 2005, and entitled "TELEPHONE COMMUNICATIONS PROCESSING CONTROLLER," in its entirety by reference. This application is also a continuation-in-part of U.S. patent application Ser. No. 11/031,498, filed Jan. 6, 2005, and entitled "TELEPHONE WITH AUTOMATIC SWITCHING BETWEEN CELLULAR AND VOIP NETWORKS", which is hereby incorporated by reference. U.S. patent application Ser. No. 11/031,498 claims priority of U.S. provisional application, Ser. No. 60/534,466, filed Jan. 6, 2004, and entitled "RADIOTELEPHONE WITH AUTOMATIC SWITCHING BETWEEN CELLULAR AND WI-FI NETWORKS USING WI-FI SIGNAL STRENGTH VALUES," the content of which is incorporated herein by reference in its entirety.

FIELD OF THE INVENTION

The present invention relates to the field of network communication processing. In particular, the present invention relates to seamlessly switching communications among Voice over Internet (VOIP), public cellular, and public circuit switched networks.

BACKGROUND OF THE INVENTION

Current telephone communications occur over wireless cellular networks, such as GSM, CDMA, and CDMA2000, Voice Over Internet (VOIP), or circuit switched network, such as PSTN. Current state of the art of most telephones used with such networks is that each telephone is restricted for use with only one specific network. For example, a cellular phone works in a cellular network; a VOIP phone works in VOIP network, and a landline phone works in a circuit switched network. Such limitations imply that an in-progress telephone communication cannot be seamlessly switched among cellular, VOIP, and circuit switched networks without losing the connection.

Such wireless networks use regulated portions of the radio spectrum and are shared by many users. The infrastructure costs of wireless networks are relatively high due to the size and complexity of the network equipment. There is a wide variance in the performance of different wireless networks. For example, a conventional wireless cellular network covers a relatively large geographical area, but provides a relatively low bandwidth. Other wireless networks, such as CDMA2000-EV-DO/DV networks, offer higher bandwidth and enhanced data services, such as web browsing. However, these networks also pack many users into a relatively small portion of the regulated spectrum. Other types of wireless networks are adapted to improve spectral efficiency with increased speed and smaller coverage areas. For example, an IEEE 802.11x (or WiFi) network may transmit at speeds up to 11 Mbps using a Direct Sequence Spread Spectrum (DSSS) mode or at speeds up to 54 Mbps using an Orthogonal Frequency Division Multiplexing (OFDM) mode.

A network wireless access point conforming to a WiFi (e.g., IEEE 802.11b) network may cover an area of a few hundred feet in diameter. Each such network access point is connected to a larger network (e.g., Internet). One such example is WiFi VOIP (Wireless Fidelity Voice over Internet Protocol), through which a communication device user can place a wireless telephone call over the Internet, using the technology specified in IEEE 802.xx at the network access point. VOIP is a method for taking analog audio signals and converting them into digital data that can be transmitted over the Internet. Conventional VOIP telephone communications are enabled by VOIP network carriers, which utilize VOIP networks (e.g. the Internet), to place VOIP based telephone calls. VOIP enabled and compatible networks include VOIP switching for proper routing and billing of VOIP based telephone calls.

In order to cover larger geographical areas, a relatively large number of IEEE 802.11x, for example, network access points and relatively large wire-line back haul networks are required. In part, due to the relatively small geographical coverage area of each network access point, the resulting IEEE 802.11x based network may thus be prohibitively expensive to set up. Further, the small coverage areas may lead to many "dead zones" in which mobile communication device users are unable to place telephone calls using the VOIP network.

Conventional VOIP phones, which function in a WiFi coverage area (hotspot) corresponding to a WiFi access point, offers relatively inexpensive telephone communications. However, the WiFi availability is limited due to the small geographical area supported by each WiFi access point.

Conventional cellular phones, which function in a cell coverage area within the cellular network, are relatively expensive for telephone communications and have limited multimedia capabilities. Cellular networks and availability to the network covers a much wider, extensive geographical area.

Conventional landline phones, which function in a circuit switched network such as most residences, do not offer extensive telephone communication features, for example video. Such landline phones also do not offer the mobility provided by mobile communications devices such as the VOIP phones or the cellular phones.

SUMMARY OF THE INVENTION

The present invention is directed to an interface server, referred to as a nomadic server, and a related system that provides seamless roaming of a mobile communication device between different types of wireless networks, such as WiFi and cellular networks for voice, data and video communication. Use of the nomadic server enables a combination of WiFi and cellular networks for providing access to the mobile communication device and makes use of the VOIP networks for switching the calls wherever possible.

The nomadic server is a telephone communication processing and switching server that will "hold" the present, in-progress telephone communications without dropping, while roaming between WiFi access points and cellular networks, without losing the present, in-progress communication. For example, a telephone communication can be seamlessly switched between VOIP and cellular telephone networks using the nomadic server. Nomadic server resources interface with the VOIP and cellular network switches to provide the hand-off between networks. This approach enables switching of telephone communications over a VOIP network wherever possible either through WiFi or through cellular networks.

In one aspect of the present invention, a method provides communications for a mobile communication device that roams between multiple different types of wireless networks. The method comprises establishing a first communication link between the mobile communication device and an end destination device, wherein the first communication link includes a first wireless communication link between the mobile communication device and a first type of wireless network, monitoring a signal strength of the first wireless communication link, when the signal strength drops below a predetermined threshold, establishing a second communication link between an interface server and the end destination device, notifying the mobile communication device to terminate transmission over the first communication link, and re-directing the second communication link from the interface server to the mobile communication device, thereby establishing a second wireless communication link between the mobile communication device and the second type of wireless network. The first type of wireless communication link can comprise a WiFi communication link, and the first type of wireless network can include a WiFi network access point. The second type of wireless network can include a wireless cellular network. Establishing the first communication link can include routing through a VOIP network. Establishing the first communication link can include routing through a cellular network. Establishing the second communication link can include routing through a VOIP network. Establishing the second communication link can include routing through a cellular network.

The method can also include providing a connectivity status by the mobile communication device to the interface server while the mobile communication device is within a first coverage area of the first type of wireless network. The method can also include providing a routing association to a mobile switching center within the second type of wireless network, wherein the routing association associates the mobile communication device to the interface server. The method can also include routing a termination communication intended for the mobile communication device from the mobile switching center to the interface server according to the routing association when the connectivity status is active, and routing the termination communication from the interface server to the mobile communication device over the first type of wireless network. The method can also include when the connectivity status is not provided to the interface server, the router association is removed from the mobile switching center. The method can also include registering the mobile communication device with a mobile switching center within the second type of wireless network when the signal strength drops below the predetermined threshold. The method can also include setting up the second communication link with the end destination device and forwarding the second communication link to the interface server.

In another aspect of the present invention, a method provides communications for a mobile communication device that roams between multiple WiFi coverage areas. The method includes associating the mobile communication device with a nomadic server, wherein the nomadic server is coupled to one or more WiFi access points, establishing a first WiFi communication link between the mobile communication device and a first WiFi access point, registering the mobile communication device with the nomadic server including providing an IP address of the first WiFi access point to the nomadic server, configuring a communication path to the mobile communication device via the nomadic server according to the IP address of the first WiFi access point and the first WiFi communication link, detecting movement of the mobile communication device into a coverage area of a second WiFi access point, registering the mobile communication device with the nomadic server including an IP address of the second WiFi access point, establishing a second WiFi communication link between the mobile communication device and the second WiFi access point, and re-configuring the communication path according to the IP address of the second WiFi access point and the second WiFi communication link. The method can also include associating the mobile communication device to the nomadic server at the mobile switching center. The method can also include providing a routing association to a mobile switching center within a cellular network, wherein the routing association associates the mobile communication device to the interface server. The method can also include routing a termination communication intended for the mobile communication device from the mobile switching center to the interface server according to the routing association, and routing the termination communication from the interface server to the mobile communication device over the communication path. Registering the mobile communication device with the nomadic server can provide a connectivity status of the mobile communication device while the mobile communication device is within a specific coverage area of a specific WiFi access point.

In yet another aspect of the present invention, a system provides communications for a mobile communication device that roams between multiple different types of wireless networks. The system includes a plurality of different types of wireless networks, the mobile communication device configured to access the plurality of wireless networks, and an interface server coupled to the plurality of wireless networks, wherein the interface server maintains a seamless communication link between the mobile communication device and an end destination device as the mobile communication device roams from a first wireless coverage area associated within a first type of wireless network to a second wireless coverage area associated with a second type of wireless network, the interface server is configured to establish a second communication link over the second type of wireless network while a first communication link between the mobile communication device and the end destination device over the first type of wireless network is active, wherein the second communication link is initially set up to be forwarded to the interface server and subsequently the second communication link is routed to the mobile communication device as the first communication link is terminated. The first communication link can include a first wireless communication link between the mobile communication device and the first type of wireless network. The first wireless coverage area can be a WiFi coverage area, and the first wireless communication link can be a WiFi communication link between the mobile communication device and a WiFi access point. The first communication link can include a routing path through a VOIP network. The first communication link can include a routing path through a cellular network. The second communication link can include a second wireless communication link between the mobile communication device and the second type of wireless network. The second wireless coverage area can be a cellular coverage area and the second wireless communication link can be a wireless cellular communication link between the mobile communication device and a cellular base station. The second communication link can include a routing path through a VOIP network. The second communication link can include a routing path through a cellular network. The second type of wireless network can include a wireless cellular network.

In still yet another aspect of the present invention, an interface server maintains a seamless communication link between a mobile communication device and an end destination device as the mobile communication device roams from a first wireless coverage area associated within a first type of wireless network to a second wireless coverage area associated with a second type of wireless network, the interface server is configured to establish a second communication link over the second type of wireless network while a first communication link between the mobile communication device and the end destination device over the first type of wireless network is active, wherein the second communication link is initially set up to be forwarded to the interface server and subsequently the second communication link is routed to the mobile communication device as the first communication link is terminated. The interface server can also include a first inter-network function block to maintain current configuration and status information associated with the first communication link. The first wireless coverage area can be a WiFi coverage area, and the first communication link can be a WiFi communication link between the mobile communication device and a WiFi access point. The interface server can also include a second inter-network function block to maintain current configuration and status information associated with the second communication link. The interface server can also include a provisioning server to provide the mobile communication device with configuration information.

BRIEF DESCRIPTION OF THE SEVERAL VIEWS OF THE DRAWINGS

The present invention is described relative to the several views of the drawings. Where appropriate and only where identical elements are disclosed and shown in more than one drawing, the same reference numeral will be used to represent such identical elements.

DETAILED DESCRIPTION OF THE INVENTION

Embodiments of a nomadic server enable telephone communications that can be initiated using VOIP while within a VOIP access point, such as a WiFi hotspot, and enable telephone communications that can be initiated using a cellular network while within a cellular area and outside of a VOIP access point. When a caller roams outside the range of a VOIP access point, the nomadic server functions to "hold" the current telephone communication while switching occurs from the VOIP access point to the cellular network. Similarly, when a caller roams into the range of a VOIP access point while engaged in a telephone communication on the cellular network, the nomadic server functions to "hold" the current telephone communication while switching occurs from the cellular network to the VOIP access point. The nomadic server remains engaged, or active, in the telephone communication while switching from one network to another. After switching is completed, the nomadic server disengages from the telephone communication.

Figure 1:
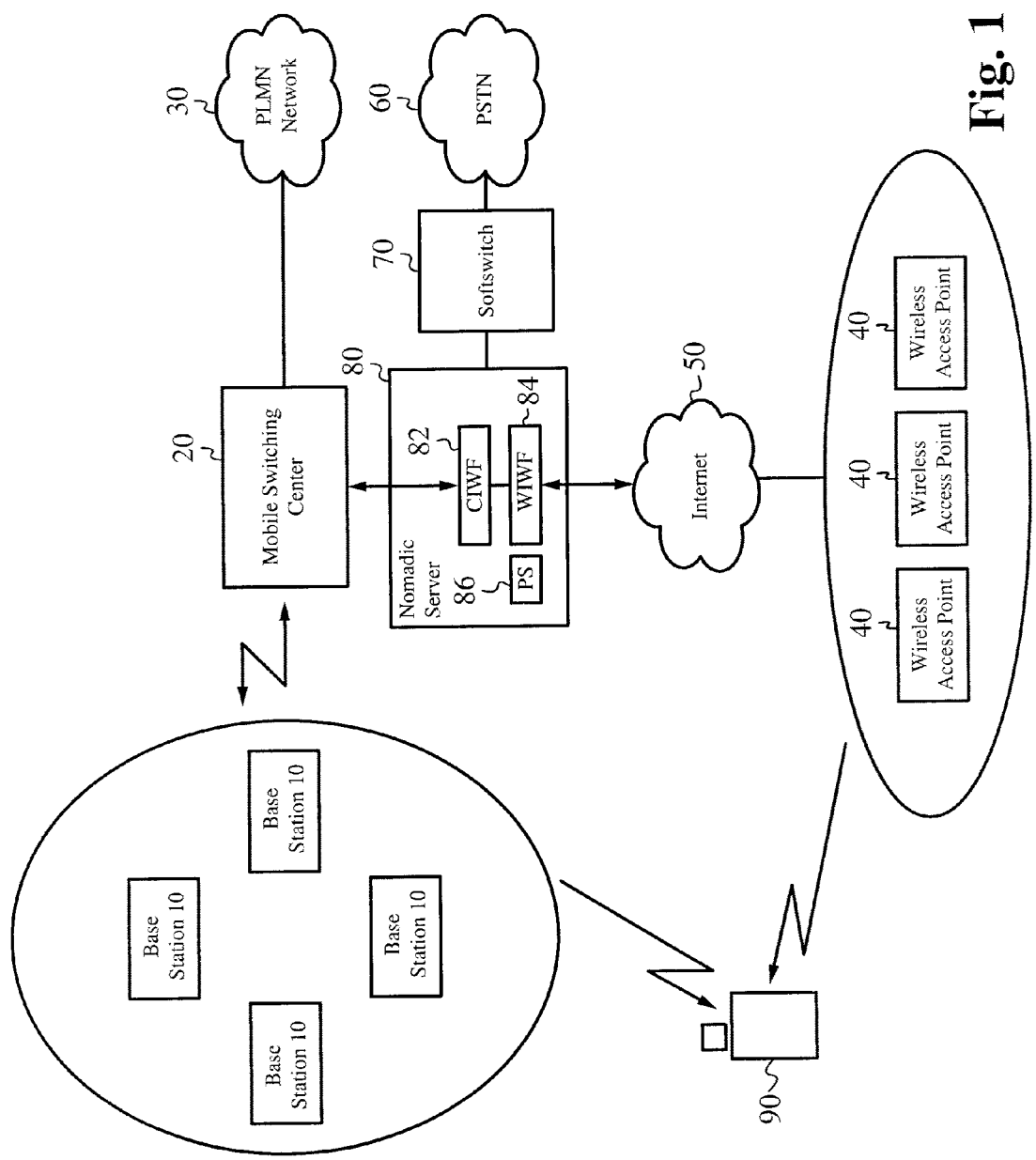
FIG. 1 illustrates an exemplary system of interconnected networks in which a nomadic server is coupled to a cellular network, a wireless IP network, and a public switched telephone network.

FIG. 1 illustrates an exemplary system of interconnected networks in which a nomadic server 80 is coupled to a cellular network, a wireless IP network, and a public switched telephone network (PSTN) 60. The cellular network shown in FIG. 1 includes a mobile switching center 20 coupled to a public land mobile network 30, and a plurality of base stations 10 coupled to the mobile switching center 20. For clarity, the cellular network shown in FIG. 1 is a simplified cellular network architecture. For example, the cellular network in FIG. 1 includes only a single mobile switching center, however it is understood that the cellular network includes multiple mobile switching centers. Further, it will be apparent to those skilled in the art, that the functionality of the mobile switching center could alternatively be incorporated into either the base station or any other cellular network infrastructure, or into the nomadic server. Accordingly, as used herein, the term mobile switching center refers to the mobile switching center or any appropriate device within the cellular network equipment infrastructure which performs the functionality of a mobile switching center. FIG. 1 shows four base stations 10 coupled to the mobile switching center 20. Alternatively, more or less than four base stations can be coupled to each mobile switching center.

The wireless IP network shown in FIG. 1 includes a plurality of wireless IP access points 40 coupled to the Internet 50. Examples of a wireless IP access point include, but are not limited to, a wireless or wired broadband termination element, a wireless or wired modem, a wireless or wired router, and a WiFi access point.

In this example, the nomadic server 80 is coupled to the PSTN 60 through the softswitch 70. The softswitch 70 provides an interface for the nomadic server 80 to legacy networks, such as the PSTN.

A mobile communication device 90 is preferably a dual mode telephone that provides VoIP client functionality over a WiFi network and GSM/CDMA mobile telephony functionality over a cellular network. The mobile communication device 90 can also be configured to automatically switch an existing communication from a cellular network to a wireless IP network, or to switch an existing communication from an IP network to a cellular network. Such a mobile communication device is described in co-pending and co-owned U.S. patent application Ser. No. 11/031,498, filed Jan. 6, 2005, and entitled "TELEPHONE WITH AUTOMATIC SWITCHING BETWEEN CELLULAR AND VOIP NETWORKS", which is hereby incorporated by reference. Alternative types of mobile communication devices include, but are not limited to, laptop computers, music players/recorders, PDAs, telephones, or any conventional mobile communication device capable of receiving broadband content over a wireless connection.

Figure 2:
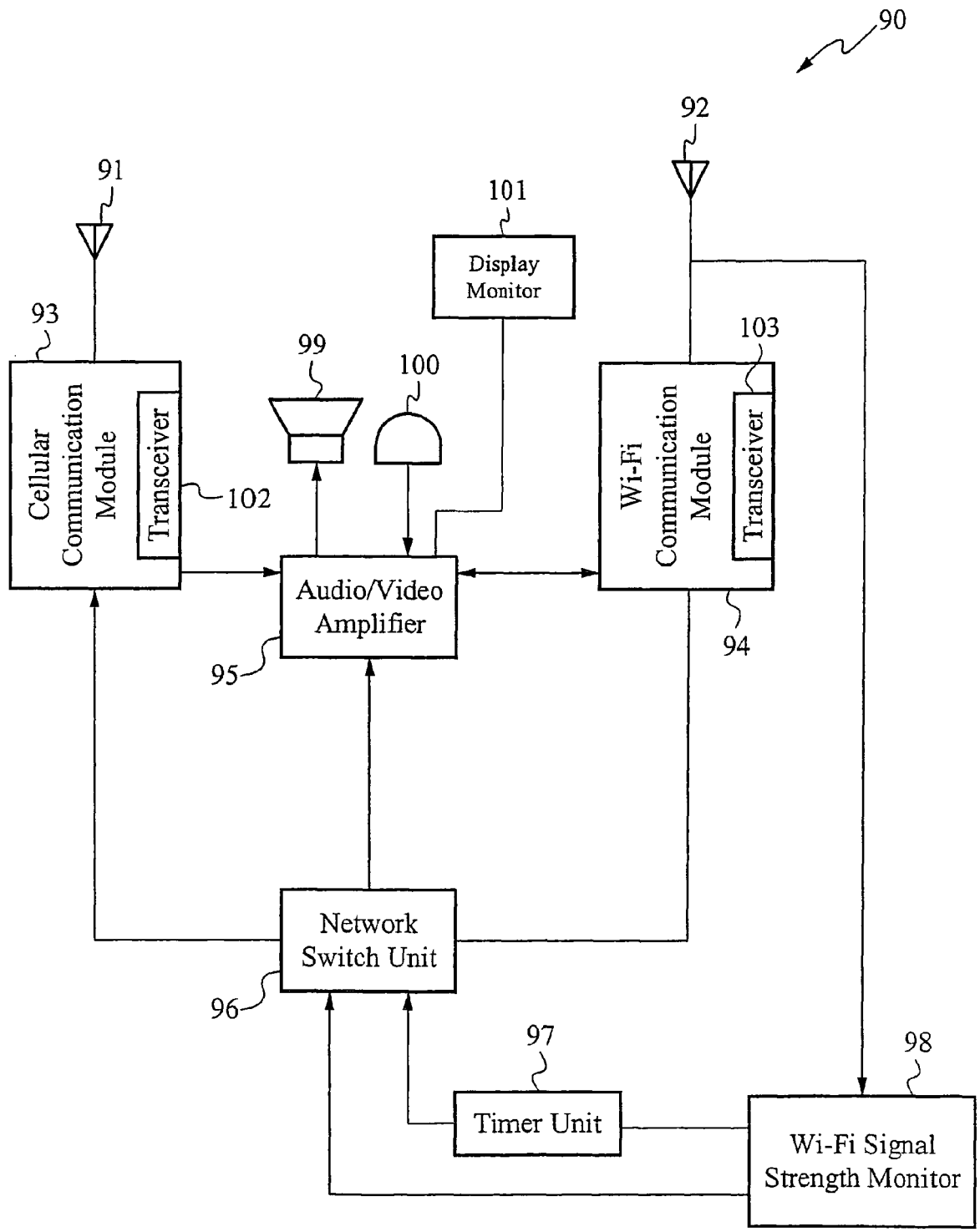
FIG. 2 illustrates a simplified high-level block diagram of one embodiment of the mobile communication device.

FIG. 2 illustrates a simplified high-level block diagram of one embodiment of the mobile communication device 90. The mobile communication device 90 includes a WiFi portion and a cellular portion. The cellular part uses either GSM or CDMA, and access to a communications network is provided through the nearest base station 10. The WiFi portion uses the VOIP client to originate and terminate communications over the WiFi network. The mobile communication device 90 is adapted to automatically switch communications between cellular and VOIP networks. The mobile communication device 90 includes a cellular communication module 93 coupled to a cellular antenna 91, a WiFi communication module 94 coupled to a WiFi antenna 92, an audio/video amplifier 95, a network switch unit 96, a timer unit 97, a WiFi signal level strength monitor 98, a microphone 100, a speaker 99, and a display monitor 101. The mobile communication device 90 is adapted to establish and maintain communication via either the cellular communication module 93 coupled to a cellular base station 10 (FIG. 1), and/or via the WiFi communication module 94 coupled to a WiFi access point 40 (FIG. 1). The cellular communication module 93 further includes a transceiver 102 adapted to transmit signals to and receive signals from a cellular network. The WiFi communication module 94 further includes a transceiver 103 adapted to transmit signals to and receive signals from an IP network. Depending on the level of the detected WiFi signal emitted from a WiFi access point, a call initially established via cellular communication module 93 can be switched to be handled by the WiFi communication module 94, or a call initially established via the WiFi communication module 94 can be switched to be handled by the cellular communication module 93.

Referring back to FIG. 1, the nomadic server 80 enables a seamless handoff from one wireless access point to another as the mobile telephone device 90 roams from one WiFi coverage area to another WiFi coverage area, or roams outside a WiFi coverage area but still within a cellular network coverage area. The nomadic server 80 includes a cellular inter-working function (CIWF) block 82, a WiFi inter-working function (WIWF) block 84, and a provisioning server 86. The nomadic server 80 and the mobile switching center 20 are either "tightly" coupled or "loosely" coupled. When tightly coupled, the nomadic server 80 and the mobile switching center 20 are coupled together by a local area network (LAN), or a wide area network (WAN) or any other appropriate interface, using either a proprietary or non-proprietary interface of the mobile switching center 20. In this manner, the nomadic server 80 is able to communicate to the mobile switching center 20 through this interface. When loosely coupled, the nomadic server 80 and the mobile switching center 20 are coupled using an Integrated Services Digital Network (ISDNC) trunk, or by using a softswitch or any other appropriate interface. In this context, a softswitch is defined variously as a media gateway controller, call agent or gate keeper, used to control connections at the junction point between circuit and packet networks.

The nomadic server 80 is coupled to one or more mobile switching centers 20 for communicating signaling and media traffic. A point of interconnection (PoI), is formed between each mobile switching center 20 and the nomadic server 80. Within any given network, one or more nomadic servers 80 can be implemented. Each mobile communication device 90 is associated with a home nomadic server, in this case the nomadic server 80. Each nomadic server can be the home nomadic server for one or more mobile communication devices. Preferably, a mobile switching center is interfaced to only one nomadic server such that a home mobile switching center is interfaced to the home nomadic server. In this manner, the mobile communication device is associated with a home mobile switching center. Alternatively, multiple mobile switching centers are coupled to any given nomadic server.

When the mobile communication device 90 originates a call within a WiFi coverage area, a WiFi communication link is established with the nomadic server 80. The call can be completed by the nomadic server 80 over the cellular network or the VOIP network. If the call is completed over the cellular network, then the call is routed through any mobile switching center coupled to the nomadic server 80. If the call is completed over the VOIP network, then the call is routed through a softswitch 70 of a service provider, using the Session Initiation Protocol (SIP) or any other appropriate protocols, such as H323. In other words, if the mobile communication device 90 is located within a WiFi coverage area, then the first leg of the call is routed over a WiFi communication link and the remaining portion of the call can be routed over either the cellular network, the VOIP network, or the PSTN.

In operation, a first call is established by the mobile communication device 90 by first determining if it is in a WiFi coverage area. Such a determination is preferably made by measuring a signal strength or other criteria of the nearest WiFi access point 40, and if the signal strength or other criteria is above a predetermined threshold, then a WiFi communication link is established. If WiFi access is not available, then the mobile communication device 90 establishes a cellular communication link with the nearest base station 10. When the mobile communication device 90 first establishes a WiFi communication link, the mobile communication device 90 establishes a communication registration link with the provisioning server 86 over the WiFi communication link. The WiFi communication link includes the WiFi access point 40, and the Internet 50. The provisioning server 86 provides the mobile communication device 90 with configuration information including an identification of its home nomadic server, which in this case is the nomadic server 80. The mobile communication device 90 preferably uses XML over SSL for communicating with the provisioning server 86 over the Internet 50.

The mobile communication device 90 also registers with the nomadic server 80. In some embodiments, a SIP REGISTER method or any other appropriate protocol, such as H323, with authentication is used between the mobile communication device 90 and the nomadic server 80. The nomadic server 80 also maintains configuration information of the mobile switching center 20. The nomadic server 80 updates the mobile switching center 20 with a current location of the mobile communication device 90. The current location refers to the WiFi access point associated with the WiFi coverage area in which the mobile communication device 90 is currently located. The nomadic server 80 updates the mobile switching center 20 with the location of the mobile communication device 90 at a specified periodicity. In this manner, the mobile switching center 20 maintains a current location of the mobile communication device 90. Using this location information, calls received over the cellular network for the mobile communication device 90 are directed from the mobile switching center 20 over the WiFi communication link via the nomadic server 80.

As long as the mobile communication device 90 maintains a WiFi communication link with the wireless access point 40, irrespective of the cellular network coverage, the mobile communication device 90 registers with its home nomadic server, the nomadic server 80 in this case. The nomadic server 80 in turn updates the current location of the mobile communication device 90 in the mobile switching center 20. When a signal strength or other criteria of the WiFi communication link weakens below a predetermined threshold, the mobile communication device 90 notifies the nomadic server 80. In response, the nomadic server 80 stops sending location updates to the mobile switching center 20. Additionally, the mobile communication device 90 stops sending SIP registrations to the nomadic server 80, and the mobile communication device 90 initiates registration with the nearest mobile switching center. In this manner, subsequent calls originating from or terminating at the mobile communication device 90 are handled by the mobile switching center. The nearest mobile switching center can be the home mobile switching center of the mobile communication device 90 or another mobile switching center, referred to as a visitor mobile switching center, within the cellular network.

While the first call is still established over the WiFi communication link, the mobile communication device 90 sets up a second call to the same end destination as the first call currently setup over the WiFi communication link, thereby establishing a cellular communication link. If the cellular communication link is established via the home mobile switching center, then the second call is routed to the nomadic server 80 via the PoI between the home mobile switching center and the nomadic server 80. In response, the nomadic server 80 determines if the first call over the WiFi communication link is still in progress. If so, access is switched from the WiFi communication link to the cellular communication link.

If, however, the cellular communication link is established over a visitor mobile switching center, then the visitor mobile switching center forwards the second call to a visitor nomadic server coupled to the visitor mobile switching center. The visitor nomadic server can not determine the status of the first call over the WiFi communication link, so the visitor nomadic server switches the second call to the end destination. Concurrently, the home nomadic server, which previously received the notification from the mobile communication device 90 about losing the WiFi communication link, waits for a connection request from the home mobile switching center for the second call to be established. However, the home nomadic server will not receive such a connection request since the second call is being processed by the visitor nomadic server. As such, the home nomadic server drops the first call on the WiFi communication link, and the second call is maintained by the mobile communication device 90 over the cellular communication link.

Once a cellular communication link is established between the mobile communication device 90 and the nearest mobile switching center, the mobile communication device 90 does not attempt to establish another WiFi communication link upon re-entering a WiFi coverage area. The mobile communication device 90 attempts access to a WiFi communication link when the mobile communication device 90 is back in an idle state.

As the mobile communication device roams from a first coverage area to a second coverage area, the transition steps vary depending on the type of the second coverage area and on the original call setup configuration. Roaming from the first coverage area to the second coverage area can generally be accomplished according to one of five different scenarios, each scenario including associated transition steps.

A first scenario includes the mobile communication device roaming from a first WiFi coverage area to a second WiFi coverage area. The first WiFi coverage area is associated with a first WiFi access point, and the second WiFi coverage area is associated with a second WiFi access point. Each WiFi access point includes an IP address. When the mobile communication device is within the first WiFi coverage area, the mobile communication device registers with its home nomadic server over the first WiFi access point. The home nomadic server updates the location of the mobile communication device with the home mobile switching center of the mobile communication device. For incoming calls directed to the mobile communication device, the home mobile switching center routes the calls to the home nomadic server based on the most recent location information.

When the mobile communication device roams into the second WiFi coverage area, the mobile communication device detects the transition. The mobile communication device acquires the IP address from the second WiFi access point and sends the IP address change to the provisioning server of the home nomadic server. The mobile communication device also sends a SIP register message with the new IP address to the home nomadic server. In response, the home nomadic server redirects any incoming calls to the IP address of the second WiFi access point. The location of the mobile communication device maintained by the home mobile switching center is still valid.

A second scenario includes the mobile communication device 90 initiating a call within a first WiFi coverage area, setting up the call over a VOIP network, and roaming from the first WiFi coverage area to a cellular coverage area supported by the home mobile switching center of the mobile communication device 90. In this scenario, the mobile communication device 90 roams from the first WiFi coverage area to a non-WiFi coverage area. When a first call is initiated and setup, a WiFi communication link is established between the mobile communication device and a first wireless access point associated with the first WiFi coverage area. When the mobile communication device is within the first WiFi coverage area, the mobile communication device registers with its home nomadic server via the first WiFi access point. The first call is routed from the first wireless access point through a VOIP network, such as the Internet.

The mobile communication device monitors a signal strength or other criteria of the WiFi communication link. When the signal strength or other criteria drops below a predetermined threshold, the mobile communication device registers with the nearest mobile switching center, which in this second scenario is the home mobile switching center of the mobile communication device. The mobile communication device also sends a call setup request to the home mobile switching center for a second call with the same end destination as the first call. The second call is setup by the home mobile switching center, and the second call is routed to the CIWF block within the home nomadic server. The CIWF block determines from the WIWF block if the first call is in progress. If the first call is in progress, then the CIWF block sends an affirmative answer message to the home mobile switching center. The home mobile switching center in turn sends the affirmative answer message to the mobile communication device.

In response to receiving the affirmative answer message, the mobile communication device stops media streaming over the WiFi communication link and powers down the WiFi part. The CIWF block then changes the registration of the mobile communication device in the WIWF block with an IP address of the CIWF block. The CIWF block sends a re-invite message to the WIWF block signifying a media switchover to the IP address of the CIWF block from the IP address of the first wireless access point. Media streaming associated with the first call is then redirected to the CIWF block, where the media is then switched over to the home mobile switching center. Media associated with the first call is now associated with the second call, where the media is now streamed from the VOIP network to the WIWF block to the CIWF block to the home mobile switching center to the mobile communication device. The transition according to the second scenario is now complete. If the second call is subsequently disconnected by the mobile communication device, then the corresponding call breakdown process is supervised by the CIWF block. If the second call is subsequently disconnected by the end destination device, then the corresponding call breakdown process is supervised by both the WIWF block and the CIWF block.

A third scenario includes the mobile communication device initiating a call within a first WiFi coverage area, setting up a back end of the call over a cellular network, and roaming from the first WiFi coverage area to a cellular coverage area supported by the home mobile switching center of the mobile communication device. In this scenario, the mobile communication device roams from the first WiFi coverage area to a non-WiFi coverage area. When a first call is initiated and setup, a WiFi communication link is established between the mobile communication device and a first wireless access point associated with the first WiFi coverage area. When the mobile communication device is within the first WiFi coverage area, the mobile communication device registers with its home nomadic server via the first WiFi access point. The first call is routed from the wireless access point 40 through a cellular network, such as the mobile switching center and either the PLMN or the PSTN.

The mobile communication device monitors a signal strength or other criteria of the WiFi communication link. When the signal strength or other criteria drops below a predetermined threshold, the mobile communication device registers with the nearest mobile switching center, which in this third scenario is the home mobile switching center of the mobile communication device. The mobile communication device also sends a call setup request to the home mobile switching center for a second call with the same end destination as the first call. The second call is setup by the home mobile switching center, and the second call is routed to the CIWF block within the home nomadic server. The CIWF block determines from the WIWF block if the first call is in progress. If the first call is in progress, then the CIWF block sends an affirmative answer message to the home mobile switching center. The home mobile switching center in turn sends the affirmative answer message to the mobile communication device.

In response to receiving the affirmative answer message, the mobile communication device stops media streaming over the WiFi communication link and powers down its WiFi part. The CIWF block then changes the registration of the mobile communication device in the WIWF block with an IP address of the CIWF block. The CIWF block sends a re-invite message to the WIWF block signifying a media switchover to the IP address of the CIWF block from the IP address of the first wireless access point. Media streaming associated with the first call is then redirected to the CIWF block, where the media is then switched over to the home mobile switching center. The media stream associated with the first call is now associated with the second call, where the media stream is now directed from the cellular network to the CIWF block to the home mobile switching center to the mobile communication device. The transition according to the third scenario is now complete. If the second call is subsequently disconnected by the mobile communication device, then the corresponding call breakdown process is supervised by the CIWF block and the home mobile switching center. If the second call is subsequently disconnected by the end destination device, then the corresponding call breakdown process is supervised by the CIWF block.

A fourth scenario includes the mobile communication device initiating a call within a first WiFi coverage area that resides outside a cellular coverage area supported by the home mobile switching center of the mobile communication device, setting up a back end of the call over a VOIP network, and roaming from the first WiFi coverage area to a cellular coverage area supported by a visitor mobile switching center. In this scenario, the mobile communication device roams from the first WiFi coverage area to a non-WiFi coverage area. When a first call is initiated and setup, a WiFi communication link is established between the mobile communication device and a first wireless access point associated with the first WiFi coverage area. When the mobile communication device is within the first WiFi coverage area, the mobile communication device registers with its home nomadic server via the first WiFi access point. In this manner, the WIWF block in the home nomadic server monitors the location of the mobile communication device. The first call is routed from the mobile communication device to the first wireless access point via the WiFi communication link to the WIWF block of the visitor nomadic server associated with the visitor mobile switching center to the VOIP network The mobile communication device monitors a signal strength or other criteria of the WiFi communication link. When the signal strength or other criteria drops below a predetermined threshold, the mobile communication device registers with the nearest mobile switching center, which in this fourth scenario is the visitor mobile switching center. The mobile communication device notifies the WIWF block in its home nomadic server that the signal strength or other criteria is below the predetermined threshold. The mobile communication device also sends a call setup request to the visitor mobile switching center for a second call with the same end destination as the first call. The visitor mobile switching center forwards the call setup request to the CIWF block within the visitor nomadic server. Within the visitor nomadic server, the CIWF block determines from the WIWF block if the first call is in progress. Since the mobile communication device has been registering itself with its home nomadic server, and not with the visitor nomadic server, the WIWF block within the visitor nomadic server does not have a record of the first call being in progress. In response, the visitor nomadic server sets up the second call over the cellular network. Concurrently, the home nomadic server tears down the first call over the VOIP network.

A fifth scenario includes the mobile communication device initiating a call within a first WiFi coverage area that resides outside a cellular coverage area supported by the home mobile switching center of the mobile communication device, setting up a back end of the call over a cellular network, and roaming from the first WiFi coverage area to a cellular coverage area supported by a visitor mobile switching center. In this scenario, the mobile communication device roams from the first WiFi coverage area to a non-WiFi coverage area. When a first call is initiated and setup, a WiFi communication link is established between the mobile communication device and a first wireless access point associated with the first WiFi access point. The first call is routed from the mobile communication device to the first wireless access point via the WiFi communication link to the CIWF block of the visitor nomadic server to the visitor mobile switching center to the cellular network.

The mobile communication device monitors a signal strength or other criteria of the WiFi communication link. When the signal strength or other criteria drops below a predetermined threshold, the mobile communication device registers with the nearest mobile switching center, which in this fifth scenario is the visitor mobile switching center. When the mobile communication device is within the first WiFi coverage area, the mobile communication device registers with its home nomadic server via the first WiFi access point. In this manner, the WIWF block in the home nomadic server monitors the location of the mobile communication device. The mobile communication device notifies the WIWF block in its home nomadic server that the signal strength or other criteria is below the predetermined threshold. The mobile communication device also sends a call setup request to the visitor mobile switching center for a second call with the same end destination as the first call. The visitor mobile switching center forwards the call setup request to the CIWF block within the visitor nomadic server. Within the visitor nomadic server, the CIWF block determines from the WIWF block if the first call is in progress. Since the mobile communication device has been registering itself with its home nomadic server, and not with the visitor nomadic server, the WIWF block within the visitor nomadic server does not have a record of the first call being in progress. In response, the visitor nomadic server sets up the second call over the cellular network. Concurrently, the home nomadic server tears down the first call over the cellular network and the first WiFi communication link.

It is understood that the five scenarios described above are not exhaustive or inclusive of all scenarios in which the mobile communication device can roam from a first coverage area to a second coverage area with the support of the nomadic server. It is understood that other scenarios are also contemplated.

In some embodiments, the nomadic server 80 also communicates to other nomadic services over the Internet to route and complete calls using VOIP. This server-to-server communication can be used for all calls, even for cellular to cellular calls. In such a situation, the cellular telephone communication is transmitted from the initiating cellular telephone to the appropriate base station. From this base station, the communication is routed to the appropriate nomadic server 80, which in some embodiments is the nomadic server 80 that is the closest to the receiving base station 10. This initiating nomadic server 80 then transmits the communication over the Internet, to the nomadic server 80 that is closest to the appropriate base station 10 corresponding to the location of the receiver's cellular telephone. This receiving nomadic server 80 then transmits the communication to this receiving base station 10, which transmits the communication to the receiver's cellular telephone. In this manner, the only portions of the transmission that are communicated over the cellular telephone network, are the initial leg, from the initiating cellular telephone to the appropriate base station, and the final leg, from the appropriate base station to the receiver's cellular telephone. The remaining, intermediate, portions of the transmission are communicated between the appropriate nomadic servers over the Internet, which allows the call to be completed more efficiently than if the call was transmitted completely over the cellular network in the traditional manner. As will be apparent to those skilled in the art, communications are directed in both directions in this manner in order to complete the call between the initiator and the receiver, with the initial and final portions of the transmission routed over the cellular network and the remaining intermediate portions of the transmission routed between nomadic servers 80, over the Internet 50.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made to the embodiments chosen for illustration without departing from the spirit and scope of the invention.

We claim:

1. A system to provide communications for a mobile communication device that roams between multiple different types of wireless networks, the system comprising:
    a. a plurality of different types of wireless networks;
    b. the mobile communication device configured to access the plurality of wireless networks; and
    c. an interface server coupled to the plurality of wireless networks, wherein the interface server maintains a seamless communication link between the mobile communication device and an end destination device as the mobile communication device roams from a first wireless coverage area associated within a first type of wireless network to a second wireless coverage area associated with a second type of wireless network, the interface server is configured to establish a second communication link over the second type of wireless network while a first communication link between the mobile communication device and the end destination device over the first type of wireless network is active, wherein the second communication link is initially set up to be forwarded to the interface server and subsequently the second communication link is routed to the mobile communication device as the first communication link is terminated and further wherein the interface server connects to the first type of wireless network and the second type of wireless network; and
        wherein the mobile communication device notifies the interface server if the first communication link falls below a threshold.

2. The system of claim 1 wherein the first communication link includes a first wireless communication link between the mobile communication device and the first type of wireless network.

3. The system of claim 2 wherein the first wireless coverage area comprises a WiFi coverage area, and the first wireless communication link comprises a WiFi communication link between the mobile communication device and a WiFi access point.

4. The system of claim 2 wherein the first communication link includes a routing path through a VOIP network.

5. The system of claim 2 wherein the first communication link includes a routing path through a cellular network.

6. The system of claim 1 wherein the second communication link includes a second wireless communication link between the mobile communication device and the second type of wireless network.

7. The system of claim 6 wherein the second wireless coverage area comprises a cellular coverage area and the second wireless communication link comprises a wireless cellular communication link between the mobile communication device and a cellular base station.

8. The system of claim 6 wherein the second communication link includes a routing path through a VOIP network.

9. The system of claim 6 wherein the second communication link includes a routing path through a cellular network.

10. The system of claim 1 wherein the second type of wireless network includes a wireless cellular network.

11. The system of claim 1, wherein the first type of wireless network and the second type of wireless network are each selected from the group consisting of: a cellular network, an IP network, and a circuit switched network.

12. An interface server to maintain a seamless communication link between a mobile communication device and an end destination device as the mobile communication device roams from a first wireless coverage area associated within a first type of wireless network to a second wireless coverage area associated with a second type of wireless network, the interface server is configured to establish a second communication link over the second type of wireless network while a first communication link between the mobile communication device and the end destination device over the first type of wireless network is active, wherein the second communication link is initially set up to be forwarded to the interface server and subsequently the second communication link is routed to the mobile communication device as the first communication link is terminated and further wherein the interface server connects to the first type of wireless network and the second type of wireless network, and wherein the mobile communication device notifies the interface server if the first communication link falls below a threshold.

13. The interface server of claim 12 further comprising a first inter-network function block to maintain current configuration and status information associated with the first communication link.

14. The interface server of claim 13 wherein the first wireless coverage area comprises a WiFi coverage area, and the first communication link comprises a WiFi communication link between the mobile communication device and a WiFi access point.

15. The interface server of claim 13 further comprising a second inter-network function block to maintain current configuration and status information associated with the second communication link.

16. The interface server of claim 15 further comprising a provisioning server to provide the mobile communication device with configuration information.

17. The interface server of claim 12 wherein the interface server communicates to the mobile communication device through a mobile switching center.

18. The interface server of claim 17 wherein the interface server is tightly coupled to the mobile switching center through a network.

19. The interface server of claim 17 wherein the interface server is loosely coupled to the mobile switching center through a one of an trunk interface or a softswitch.

20. The interface server of claim 17 wherein the interface server communicates to the mobile switching center through an interface protocol established by the mobile switching center.

21. The interface server of claim 12, wherein the first type of wireless network and the second type of wireless network are each selected from the group consisting of: a cellular network, an IP network, and a circuit switched network.

22. A system to provide communications for a mobile communication device that roams between cellular and non-cellular wireless networks, the system comprising:
   a. cellular and non-cellular wireless networks;
   b. the mobile communication device for accessing both the cellular and non-cellular wireless networks; and
   c. an interface server coupled to the cellular and non-cellular wireless networks, wherein the interface server maintains a seamless communication link between the mobile communication device and an end destination device as the mobile communication device roams from a first wireless coverage area associated within a first type of wireless network to a second wireless coverage area associated with a second type of wireless network, the interface server is configured to establish a second communication link over the second type of wireless network while a first communication link between the mobile communication device and the end destination device over the first type of wireless network is active, wherein the second communication link is initially set up to be forwarded to the interface server and subsequently the second communication link is routed to the mobile communication device as the first communication link is terminated and further wherein the interface server connects to the first type of wireless network and the second type of wireless network; and
   wherein the mobile communication device notifies the interface server if the first communication link falls below a threshold.

23. A system to provide communications for a mobile communication device that roams between cellular and Voice over Internet (VOIP) networks, the system comprising:
   a. cellular and VOIP networks;
   b. the mobile communication device for accessing both the cellular and VOIP wireless networks; and
   c. an interface server coupled to the cellular and VOIP wireless networks, wherein the interface server maintains a seamless communication link between the mobile communication device and an end destination device as the mobile communication device roams from a first wireless coverage area associated within a first type of wireless network to a second wireless coverage area associated with a second type of wireless network, the interface server is configured to establish a second communication link over the second type of wireless network while a first communication link between the mobile communication device and the end destination device over the first type of wireless network is active, wherein the second communication link is initially set up to be forwarded to the interface server and subsequently the second communication link is routed to the mobile communication device as the first communication link is terminated and further wherein the interface server connects to the first type of wireless network and the second type of wireless network; and
   wherein the mobile communication device notifies the interface server if the first communication link falls below a threshold.

* * * * *